United States Patent
Culp et al.

[11] Patent Number: 5,868,403
[45] Date of Patent: Feb. 9, 1999

[54] MEDICAL TRANSPORT DEVICE

[76] Inventors: John A. Culp, 2804 Chichester La., Fort Wayne, Ind. 46815; Megan Crosby, 77 Murray Ave., Port Washington, N.Y. 11050; Angelos J. Dassios, 1430 N. Lake Shore Dr., Chicago, Ill. 60610; John A. Wilde, 189 S. Middletown Rd., Pearl River, N.Y. 10965

[21] Appl. No.: 771,061

[22] Filed: Dec. 20, 1996

[51] Int. Cl.⁶ ..................................................... B62B 9/02
[52] U.S. Cl. .................................. 280/5.22; 280/DIG. 10
[58] Field of Search ................................... 280/5.2, 5.22, 280/5.24, DIG. 10; 180/8.2, 9.1

[56] References Cited

U.S. PATENT DOCUMENTS

| | | | |
|---|---|---|---|
| 3,137,511 | 6/1964 | Weil et al. | 280/5.24 |
| 3,876,022 | 4/1975 | Ikarimoto | 180/9.22 |
| 4,061,199 | 12/1977 | Last | 180/8 A |
| 4,194,584 | 3/1980 | Kress et al. | 180/9.24 |
| 4,401,178 | 8/1983 | Studer | 180/8 A |
| 4,411,330 | 10/1983 | Blokland | 180/8 A |
| 4,556,229 | 12/1985 | Bihler et al. | 280/5.22 |
| 4,566,706 | 1/1986 | Bihler et al. | 280/5.22 |
| 4,585,241 | 4/1986 | Misawa et al. | 280/5.22 |
| 4,627,508 | 12/1986 | Auer | 180/9.22 |
| 4,688,813 | 8/1987 | Misawa et al. | 280/5.22 |
| 4,962,941 | 10/1990 | Rembos | 280/5.22 |
| 5,197,558 | 3/1993 | Misawa | 180/8.2 |
| 5,253,885 | 10/1993 | McCracken et al. | 280/20 |
| 5,413,367 | 5/1995 | Ochiai | 280/250.1 |

*Primary Examiner*—Kevin Hurley
*Attorney, Agent, or Firm*—Taylor & Associates, P.C.

[57] ABSTRACT

The invention is directed to a medical transport device for moving a patient down a flight of stairs. A chair has a plurality of support members. A plurality of rollers are each connected to at least one of the support members. At least one tread defining a bottom surface is wrapped around the rollers. A slider is disposed adjacent to the plurality of rollers. The slider has a bottom edge which is disposed slightly above the bottom surface of the tread.

14 Claims, 2 Drawing Sheets

MEDICAL TRANSPORT DEVICE

BACKGROUND OF THE INVENTION

1. Field of the Invention

The present invention relates to a device for moving a patient down a flight of stairs.

2. Description of the Related Art

It is known to attach a tread carried by a plurality of rollers to the bottom of a wheelchair to transport a person down a flight of stairs. The treads grip the stairs and prevent the wheelchair from sliding out of control. Difficulty may be encountered, however, in providing a smooth ride. The edges of the stairs tend to deflect the tread and alternately become lodged and dislodged between the rollers. This results in a somewhat jerky motion and jarring sensation for the patient.

It is also known to place a slider carrying an endless tread on the bottom of a chair. The slider is effective to provide a smooth descent of the chair down stairs. However, a problem with this device is that the full length of the slider is engaged while traveling on level ground, creating drag. A greater force is thus required to move the chair on a flat surface.

What is needed in the art is a device that allows a single paramedic to transport a patient down a flight of stairs in a smooth, safe, controllable manner with a minimum of strain on the paramedic and trauma to the patient.

SUMMARY OF THE INVENTION

The present invention provides a medical transport device used to move a patient down a flight of stairs. A chair is mounted on two sets of rollers carrying tracks with a slider between the two tracks.

The invention comprises, in one form thereof, a medical transport device for moving a patient down a flight of stairs. A chair has a plurality of support members. A plurality of rollers are each connected to at least one of the support members. At least one tread defining a bottom surface is wrapped around the rollers. A slider is disposed adjacent to the plurality of rollers. The slider has a bottom edge which is disposed slightly above the bottom surface of the tread.

An advantage of the present invention is that the treads provide traction to prevent the apparatus from slipping away from the paramedic while, at the same time, the rollers and slider ensure a smooth ride for the patient. The placement of the slider is such that it intercepts the edge of a stair before the edge can become lodged between the rollers.

Another advantage is that the hand brake allows the paramedic to reduce and control the speed of the apparatus as the stairs are descended.

Yet another advantage is that the apparatus has five rollers associated with each tread for rolling the apparatus on level ground with minimal resistance.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figures 1, 2:
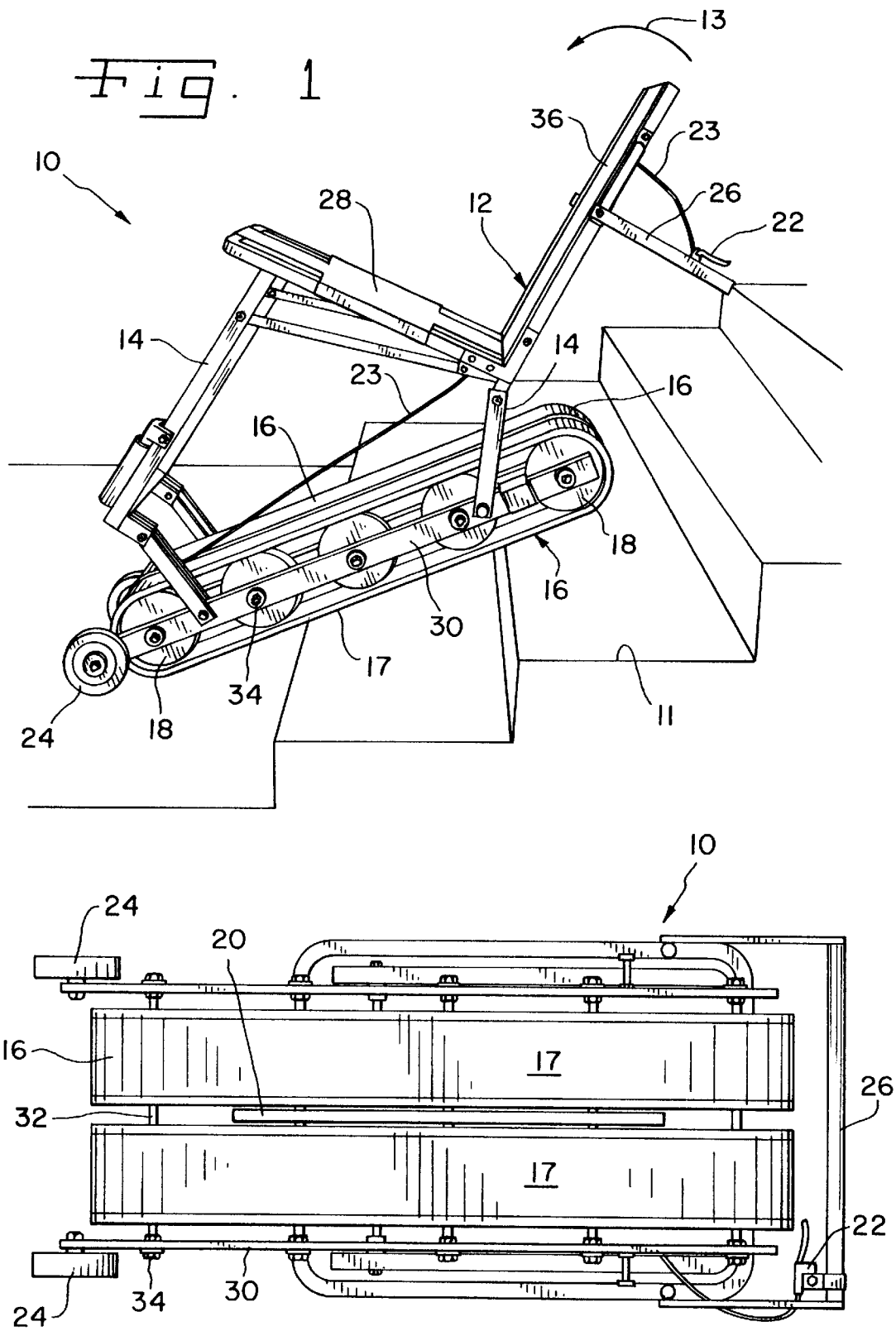
FIG. 1 is a side perspective view of one embodiment of a medical transport device of the present invention descending stairs.
FIG. 2 is a bottom view of the device of FIG. 1.

Referring now to the drawings and more particularly to FIG. 1, there is shown an embodiment of a medical transport device 10 for moving a patient down a flight of stair treads 11. Medical transport device 10 generally includes a chair 12, a pair of treads 16, rollers 18, hand brake 22 and rails 30.

Two sets of parallel, substantially co-planar rollers 18 are joined to chair legs 14 by rails 30. Axles 32, shown in FIG. 2, connect hubs 34, shown in FIG. 1, of each co-linear pair of rollers 18, one roller 18 in each pair coming from each of two sets of rollers 18. Each set of rollers 18 span the length of at least three stair treads to reduce any teeter-tottering effect as medical transport device 10 descends the stairs.

Figure 3:
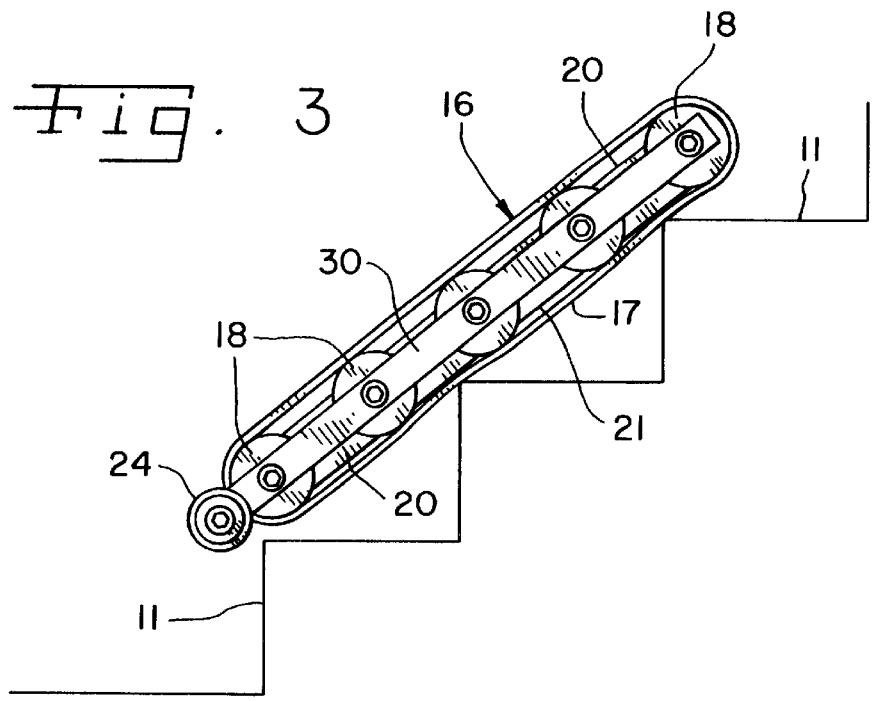
FIG. 3 is a side view of the rollers, tread and slider of FIG. 1 descending stairs.

Continuous or endless tread 16 is wrapped around a respective one of two sets of rollers 18. Each tread 16 defines a bottom surface 17 which engages the ground. Rigid slider 20 runs parallel to and between the two treads 16. Slider 20 has a bottom edge 21 which is disposed offset from, i.e., above, bottom surface 17 of tread 16. Referring to FIG. 3, slider 20 ensures a smooth ride by preventing the edges of the stairs from becoming lodged between rollers 18. After the stair edge has disengaged one roller and before it has engaged the next roller, it slides along slider 20 which intercepts the stair edge from becoming lodged between two rollers 18. In this way, slider 20 eliminates the jars that would otherwise occur from the stair edges becoming lodged and dislodged from between rollers 18.

Chair 12 includes a handle 26 to which a hand brake 22 is affixed (FIG. 1). A brake cable 23 runs from hand brake 22 on handle 26 to a brake pad (not shown) mounted on a roller 18. Squeezing hand brake 22 on handle 26 causes the brake pad to grasp a roller 18, hindering the rotation of the roller 18 which in turn hinders rotation of the tread 16. Chair 12 includes seat 28 and back 36 which are angled such that the patient is tilted slightly backwards while descending the stairs to prevent the patient from falling forward (see FIG. 1). Chair 12 is foldable in the direction shown by arrow 13 in FIG. 1 for quick and easy transport up a flight of stairs to a waiting patient. Folding of chair 12 also reduces storage space requirements.

Figure 4:
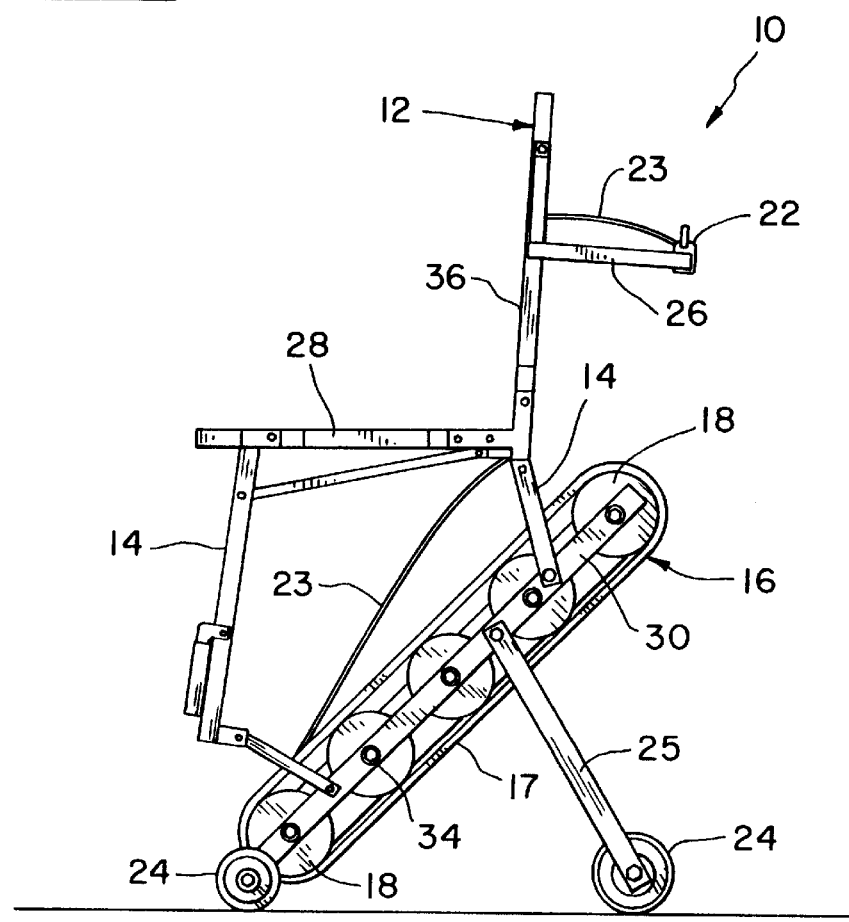
FIG. 4 is a side view of the apparatus of FIG. 1 rolling on level ground, with optional wheels attached to the track assembly.

Four optional wheels 24 are shown mounted to rails 30 in FIG. 4. The rear pair of wheels 24 are carried by legs 25. Wheels 24 allow apparatus 10 to be rolled across level ground with minimal resistance. Legs 14 of chair 12 may be pivoted and locked into position relative to rails 30 such that seat 28 is substantially horizontally positioned as shown in FIG. 4. Additional bracing structure (not shown) between rails 30 and legs 25 may also be provided to prevent movement of legs 25 relative to rails 30.

During use, rollers 18 and tread 16 rotate in a wheel-like fashion as apparatus 10 descends the stairs. Rollers 18 allow for a smooth ride and tread 16 provides traction to prevent slippage of medical transport device 10 down the stairs. A paramedic holds handle 26 and may use hand brake 22 to reduce and control the speed of medical transport device 10 as the stairs are traversed.

While this invention has been described as having a preferred, design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A medical transport device for moving a patient down a flight of stairs and over a ground surface, said medical transport device comprising:

a chair having a plurality of support members;

at least one tread, each said tread defining a corresponding bottom surface;

a plurality of rollers, each said roller at least indirectly connected to at least one of said support members, said rollers being configured to rotate as the device descends the flight of stairs and traverses the ground, each of said rollers being at least partially wrapped by said at least one tread, said rollers conjunctively and exclusively carrying said at least one tread, said rollers exclusively biasing said bottom surface of said at least one tread in a downward direction; and a slider disposed adjacent to said plurality of rollers, said slider having a bottom edge which is disposed above each said bottom surface of said at least one tread, said bottom edge of said slider being configured to at least intermittently slidingly and directly contact one of the stairs and the ground surface when at least one said tread is biased in an upward direction by one of the stairs and the ground surface.

2. The medical transport device of claim 1, further comprising at least one rail, each said rail interconnecting said rollers with at least one of said support members.

3. The medical transport device of claim 2, further comprising a plurality of wheels connected to said rails.

4. The medical transport device of claim 1, wherein said slider has a length which spans all of said rollers.

5. The medical transport device of claim 1, further comprising a hand brake which hinders rotation of at least one of said rollers.

6. The medical transport device of claim 1, wherein said support members comprise legs.

7. The medical transport device of claim 1, wherein said tread comprises an endless tread.

8. The medical transport device of claim 1, wherein said at least one tread comprises two treads.

9. The medical transport device of claim 8, wherein said plurality of rollers comprise two sets of rollers, and wherein each said tread is wrapped around a corresponding one of said sets of rollers.

10. The medical transport device of claim 9, wherein said slider is disposed between said two treads.

11. The medical transport device of claim 9, wherein said rollers have hubs, and wherein said separate sets of rollers are joined by at least one axle running through said hubs of a selected two of said rollers, each said axle carrying two said rollers with one said roller being from each said set of rollers.

12. The medical transport device of claim 1, further comprising a hand brake attached to at least one of said rollers.

13. A medical transport device for moving a patient down a flight of stairs and over a ground surface, said medical transport device comprising:

a chair having a plurality of support members;

at least one tread, each said tread defining a corresponding bottom surface;

a plurality of rollers, each said roller at least indirectly connected to at least one of said support members, said rollers being configured to rotate as the device descends the flight of stairs and traverses the ground, each of said rollers being at least partially wrapped by said at least one tread, said rollers conjunctively and exclusively carrying said at least one tread, said rollers exclusively biasing said bottom surface of said at least one tread in a downward direction; and a slider disposed adjacent to said plurality of rollers, sail slider having a bottom edge which is disposed above each said bottom surface of said at least one tread.

14. A medical transport device for moving a patient down a flight of stairs and over a ground surface, said medical transport device comprising:

a chair having a plurality of support members;

at least one tread, each said tread defining a corresponding bottom surface and a corresponding inner surface;

a plurality of rollers, each said roller at least indirectly connected to at least one of said support members, said rollers defining a means for supporting said inner surface of said at least one tread and for rotating correspondingly with a rotation of said at least one tread, thereby providing a minimum of internal resistance; and a slider disposed adjacent to said plurality of rollers, said slider defining a means for preventing one of the flight of stairs and the ground surface from upwardly biasing said at least one tread into gaps between said rollers.

* * * * *